(12) United States Patent
Tuten

(10) Patent No.: US 9,423,807 B2
(45) Date of Patent: Aug. 23, 2016

(54) SWITCHING POWER CONVERTER

(71) Applicant: QUALCOMM Incorporated, San Diego, CA (US)

(72) Inventor: Charles Derrick Tuten, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 13/787,360

(22) Filed: Mar. 6, 2013

(65) Prior Publication Data
US 2014/0253075 A1 Sep. 11, 2014

(51) Int. Cl.
*H02M 3/156* (2006.01)
*G05F 1/46* (2006.01)
*H02M 1/00* (2006.01)

(52) U.S. Cl.
CPC ............... *G05F 1/46* (2013.01); *H02M 3/156* (2013.01); *H02M 2001/0025* (2013.01)

(58) Field of Classification Search
CPC .. H02M 3/156; H02M 3/157; H02M 3/1588; H02M 3/1563; G05F 3/24; G05F 1/575
USPC ................. 323/265, 273, 280, 282–285, 351
See application file for complete search history.

(56) References Cited

U.S. PATENT DOCUMENTS

| | | | |
|---|---|---|---|
| 4,469,997 A * | 9/1984 | Curtiss et al. | 318/729 |
| 6,465,993 B1 | 10/2002 | Clarkin et al. | |
| 6,534,962 B1 | 3/2003 | Lee | |
| 6,583,609 B1 | 6/2003 | Pardoen | |
| 7,595,624 B2 | 9/2009 | Tateishi et al. | |
| 8,040,122 B2 | 10/2011 | Chang et al. | |
| 8,154,264 B2 | 4/2012 | Kenly et al. | |
| 8,188,721 B2 | 5/2012 | Isham et al. | |
| 8,575,910 B2 | 11/2013 | Young | |
| 2004/0196012 A1 | 10/2004 | Luu | |
| 2006/0001408 A1* | 1/2006 | Southwell et al. | 323/282 |
| 2006/0208716 A1* | 9/2006 | Chapuis | H02M 3/157 323/283 |
| 2010/0052637 A1* | 3/2010 | Lorentz et al. | 323/282 |
| 2010/0127682 A1 | 5/2010 | Kenly et al. | |
| 2011/0031948 A1* | 2/2011 | Chien | H02M 3/1588 323/282 |
| 2011/0127980 A1 | 6/2011 | Chen et al. | |
| 2011/0291626 A1 | 12/2011 | Murakami | |
| 2012/0153919 A1 | 6/2012 | Garbossa et al. | |
| 2012/0181950 A1 | 7/2012 | Yu et al. | |
| 2012/0194152 A1 | 8/2012 | Martinelli | |
| 2012/0217940 A1 | 8/2012 | Kiadeh et al. | |
| 2013/0038308 A1 | 2/2013 | Sumitomo | |
| 2014/0253074 A1* | 9/2014 | Tuten et al. | 323/282 |

FOREIGN PATENT DOCUMENTS

WO 2010011946 A1 1/2010

OTHER PUBLICATIONS

International Search Report and Written Opinion—PCT/US2014/018786—ISA/EPO—Jul. 8, 2014.

(Continued)

*Primary Examiner* — Adolf Berhane
(74) *Attorney, Agent, or Firm* — Arent Fox LLP

(57) ABSTRACT

Exemplary embodiments are related to a switching power converter. A device may include a switching unit configured to receive an input voltage and convey an output voltage. The device may further include a feedback path including a pulse-width modulator having an input directly coupled to the output voltage and configured to convey a signal to the switching unit.

17 Claims, 9 Drawing Sheets

(56) References Cited

OTHER PUBLICATIONS

"IEEE 100 The Authoritative Dictionary of IEEE Standards Terms Seventh Edition," IEEE Std 100-2000, pp. 435, 2000.

"Hagen R., et al., "Applying digital technology to PWM control-loop designs," http://www.ti.com/download/tmg/docs/seminar/Topic_7_Hagen, Section II, Part B, pp. 7-5."
International Search Report and Written Opinion—PCT/US2014/018789—ISA/EPO—Feb. 18, 2015.

* cited by examiner

SWITCHING POWER CONVERTER

REFERENCE TO CO-PENDING APPLICATIONS FOR PATENT

The present Application for Patent is related to the following co-pending U.S. Patent Application:

"TRANSFER FUNCTION GENERATION BASED ON PULSE-WIDTH MODULATION INFORMATION", having Ser. No. 11/198,282, filed concurrently herewith, assigned to the assignee hereof, and expressly incorporated by reference herein.

BACKGROUND

1. Field

The present invention relates generally to voltage regulation. More specifically, the present invention relates to embodiments for improving performance of a switching power converter.

2. Background

An electronic device, such as a mobile telephone, may include a power converter (i.e., a voltage regulator) that receives an input voltage from a power supply and generates an output voltage for a load. An integrated circuit may include a power converter for providing a stable voltage reference for on-chip components such as a digital component, an analog component, and/or a radio-frequency (RF) component.

A power converter may comprise a switching power converter, which rapidly switches a power transistor between saturation (i.e., completely on) and cutoff (i.e., completely off) with a variable duty cycle. A resulting rectangular waveform is low pass filtered in order to produce a nearly constant output voltage proportional to the average value of the duty cycle. One advantage of a switching power converter compared to a linear power converter is greater efficiency because the switching transistor dissipates little power as heat in either a saturated state or a cutoff state.

As understood by a person having ordinary skill in the art, a switching power converter may include a feedback to monitor and remove variations in the output voltage. However, as described more fully below, a feedback may include various components that may induce latency, delay, and/or attenuation.

A need exists for an enhanced switching power converter. More specifically, a need exists for embodiments related to a switching power converter configured for fast transient response while providing error correction functionality.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
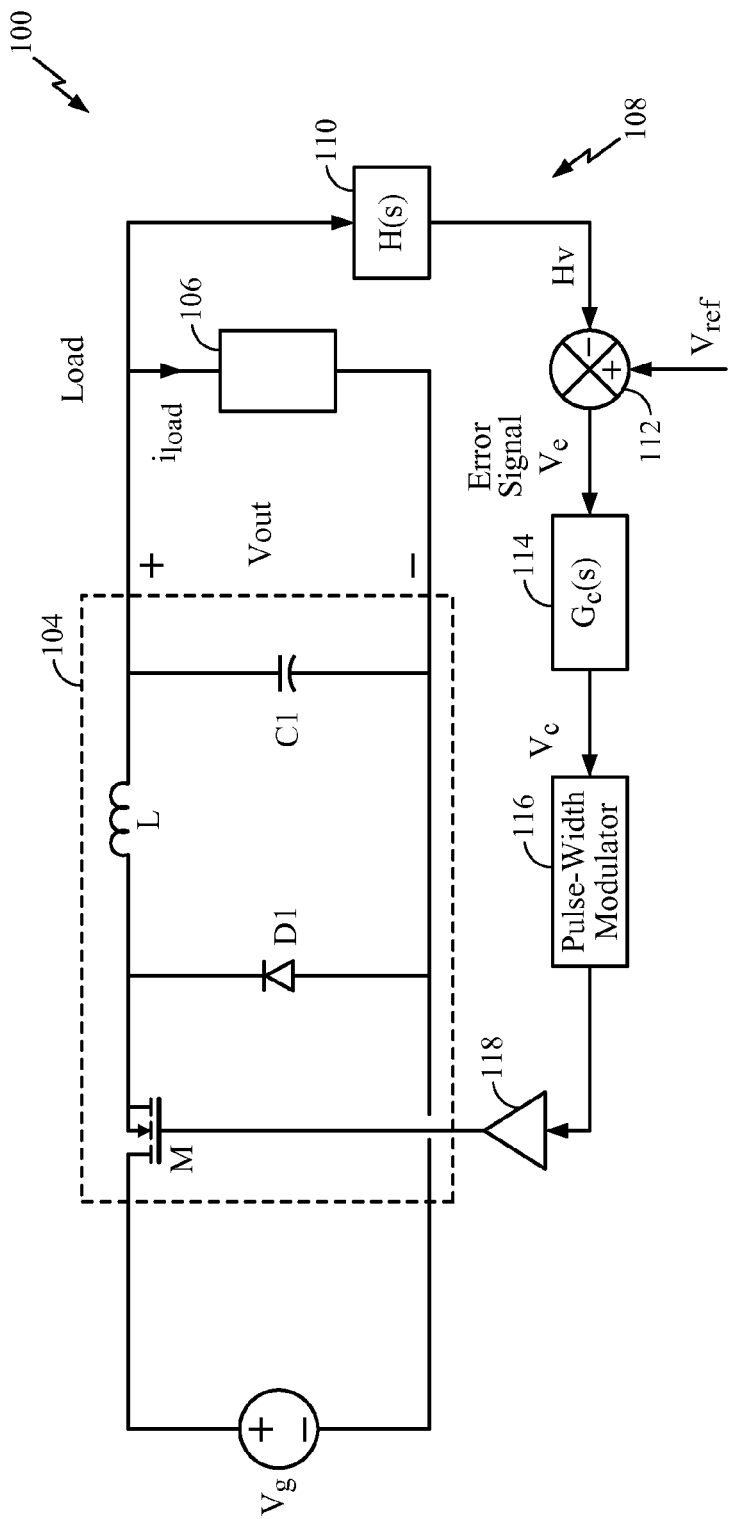
FIG. 1 illustrates a power converter including a feedback path having a sensor gain, an operational amplifier, and a compensator.

FIG. 1 illustrates a switching power converter 100 configured for receiving an input voltage Vg and conveying an output voltage Vout. Power converter 100 includes a switching unit 104, a load 106, and a feedback path 108. Switching unit 104 includes a transistor M, a diode D1, an inductor L, and a capacitor C1. Further, feedback path 108 includes a sensor gain 110, an operational amplifier 112, a compensator 114, a pulse-width modulator 116, and a gate driver 118. As will be understood by a person having ordinary skill, sensor gain 110 is configured to receive output voltage Vout and convey a feedback signal Hv to operational amplifier 112. Operational amplifier 112 is configured to receive feedback signal Hv and a reference signal $V_{ref}$, and output an error signal $V_e$ to compensator 114, which conveys a correction signal $V_c$ to pulse-width modulator 116. Correction signal $V_c$ may also be referred to herein as a "correction voltage" or an "error correction voltage." Pulse-width modulator 116 is configured to convey a signal to gate driver 118, which, upon receipt of the signal from pulse-width modulator 116, may convey a signal to transistor M1.

Figure 2:
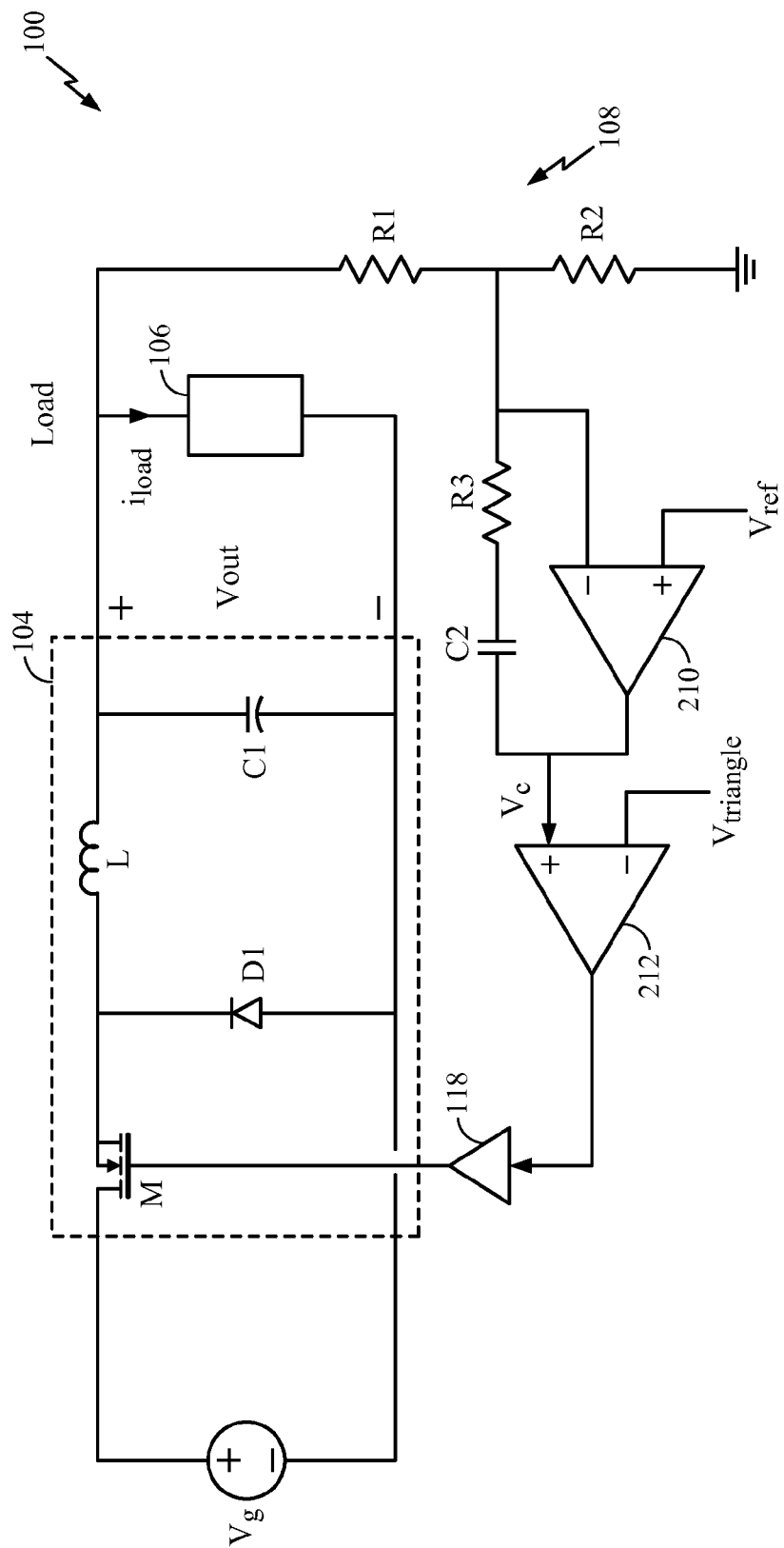
FIG. 2 is another illustration of the power converter of FIG. 1.

FIG. 2 illustrates is a more specific illustration of power converter 100. As illustrated in FIG. 2, feedback path 108 includes a voltage divider, which includes resistors R1 and R2, an RC network including a resistor R3 and a capacitor C2, amplifiers 210 and 212, and gate driver 118. As will be appreciated, the voltage divider (i.e., resistors R1 and R2) may comprise sensor gain 110 of FIG. 1, amplifier 210 may comprise operational amplifier 112 and compensator 114 of FIG. 1, and amplifier 212, which is configured to receive correction signal $V_c$ and a triangle waveform $V_{triangle}$, may comprise pulse-width modulator 116 of FIG. 1. With specific reference to FIG. 1, as will be understood by a person having ordinary skill in the art, each of sensor gain 110, operational amplifier 112, and compensator 114 may induce latency, delay, and/or attenuation. As a result, a response to a change in output voltage Vout caused by varying load conditions may be delayed.

Figure 3:
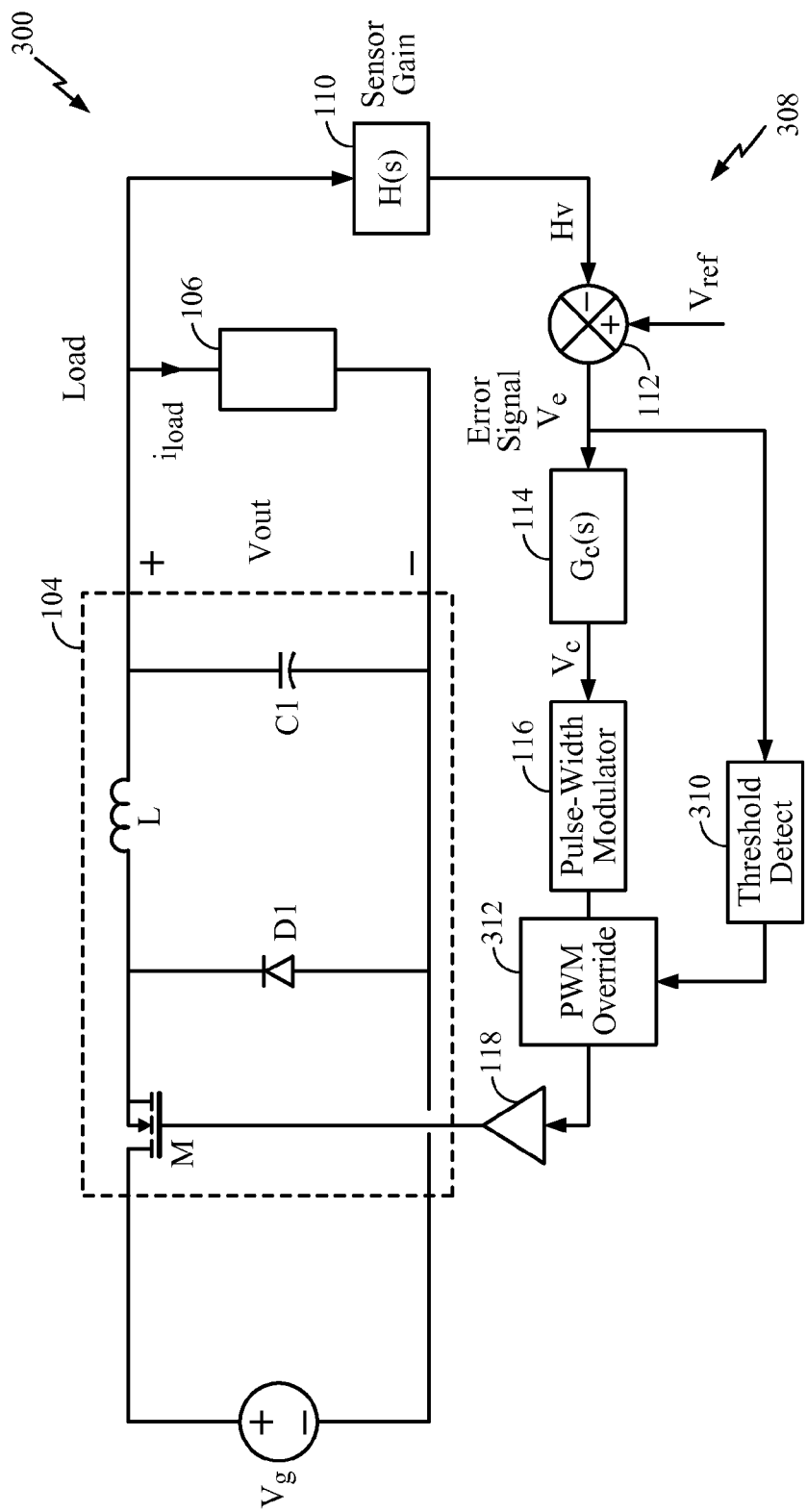
FIG. 3 illustrates another power converter including a feedback path having a sensor gain, an operational amplifier, and a compensator.

FIG. 3 illustrates another power converter 300 configured for receiving input voltage Vg and conveying output voltage Vout. Power converter 300 includes switching unit 104, load 106, and a feedback path 308. Switching unit 104 includes transistor M, diode D1, inductor L, and capacitor C1. Further, feedback path 308 includes sensor gain 110, operational amplifier 112, compensator 114, pulse-width modulator 116, and gate driver 118. In addition, for bypassing compensator 114 and pulse-width modulator 116, feedback path 308 includes a threshold detection circuit 310 and a pulse-width modulation override 312. Although, latency, delay, and attenuation issues involving compensator 114 may be avoided by bypassing compensator 114 (i.e., the transient response may be improved relative to power converter 100 of FIGS. 1 and 2), power converter 300 may still experience latency, delay, and/or attenuation issues due to sensor gain 110 and operational amplifier 112. Accordingly, a response to a change in output voltage Vout caused by varying load conditions may be delayed.

Exemplary embodiments, as described herein, are directed to devices, systems, and methods for improving performance of a switching power converter. According to one exemplary embodiment, a device may include a switching unit configured to receive an input voltage and convey an output voltage. The device may also include a pulse-width modulator having an input directly coupled to the output voltage and configured to convey a signal to the switching unit.

According to another exemplary embodiment, the present invention includes methods for operating a switching power converter. Various embodiments of such a method may include conveying an output voltage of a switching converter to a pulse-width modulator via a first path. The method may also include conveying a correction signal to the pulse-width modulator via a second, different path.

Other aspects, as well as features and advantages of various aspects, of the present invention will become apparent to those of skill in the art though consideration of the ensuing description, the accompanying drawings and the appended claims.

Figure 4:
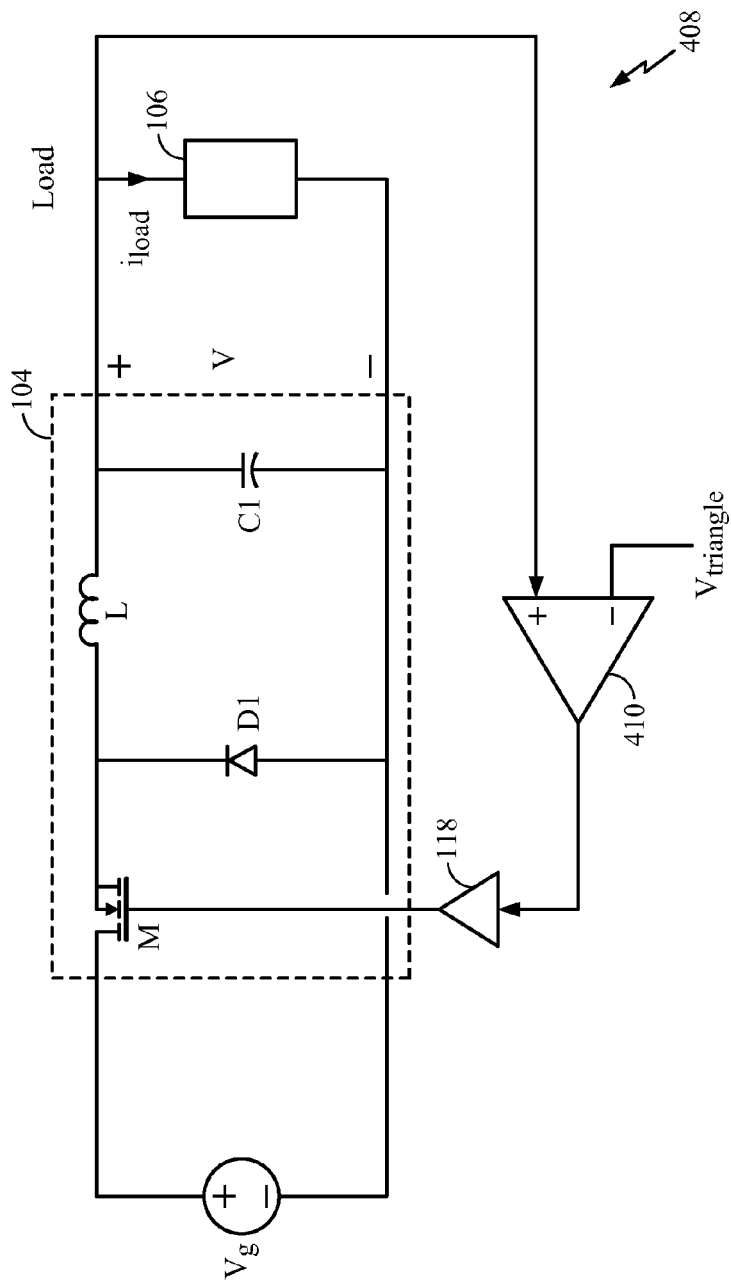
FIG. 4 illustrates a switching power converter including a switching unit configured for coupling an output voltage to an input of an amplifier, according to an exemplary embodiment of the present invention.
Figure 5:
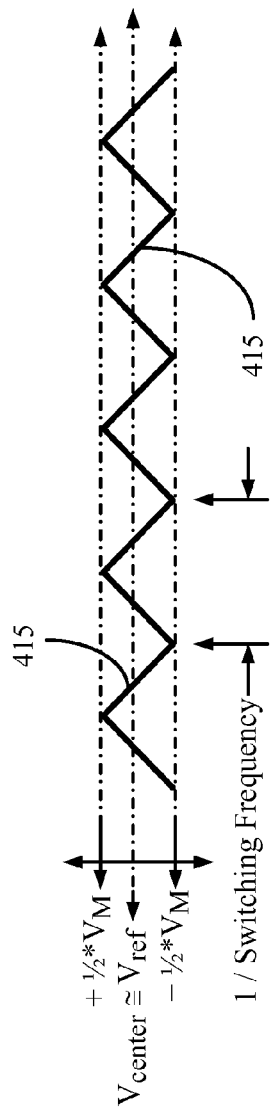
FIG. 5 depicts a triangle wave, which may be conveyed to a pulse-width modulator of a power converter.

FIG. 4 depicts a power converter 400, according to an exemplary embodiment of the present invention. Power converter 400, which is configured to receive input voltage Vg and convey an output voltage V, includes switching converter unit 104, load 106, and a feedback path 408. Switching unit 404 includes transistor M, diode D1, inductor L, and capacitor C1. Further, feedback path 408 includes an amplifier 410, which, as described below, may comprise a pulse-width modulator. Amplifier 410 includes one input configured to receive output voltage V of power converter 400 and another input configured to receive a triangle waveform ($V_{triangle}$) 415, as illustrated in FIG. 5. More specifically, as an example, a non-inverting input of amplifier 410 may be configured to receive output voltage V and an inverting input of amplifier 410 may be configured to receive triangle waveform 415. Feedback path 408 further includes gate driver 118 configured to receive an output of amplifier 410. Gate driver 118 is further configured to convey a signal to a gate of transistor M1.

It is noted that triangle waveform 415, as shown in FIG. 5, may be centered at a desired output voltage (i.e., a reference voltage $V_{ref}$). Centering triangle waveform 415 at a desired output voltage may allow for seamless non-linear operation to occur. In addition, 0% and 100% duty cycles may occur naturally, above and below triangle waveform 415. Using a small magnitude triangle waveform may provide for very high gain, which may allow power converter 400 to operate with high performance. For example the magnitude $V_M$ of triangle waveform 415 may comprise 40 millivolts (mV).

Coupling output voltage V directly to amplifier 410 allows for a fast transient response. Stated another way, feedback path 408, which lacks any elements that may induce latency, delay, and/or attenuation, directly couples output voltage V to amplifier 410 and, thus, provides amplifier 410 with maximum visibility of output voltage V. Therefore, amplifier 410 may quickly detect and respond to any changes in output voltage V. Stated yet another way, the direct connection between output voltage V and amplifier 410 (i.e., no latency, delay, and/or attenuation inducing components exist) may allow amplifier 410 to respond instantly and optimally to changes in output voltage V caused by varying load conditions.

Figure 6:
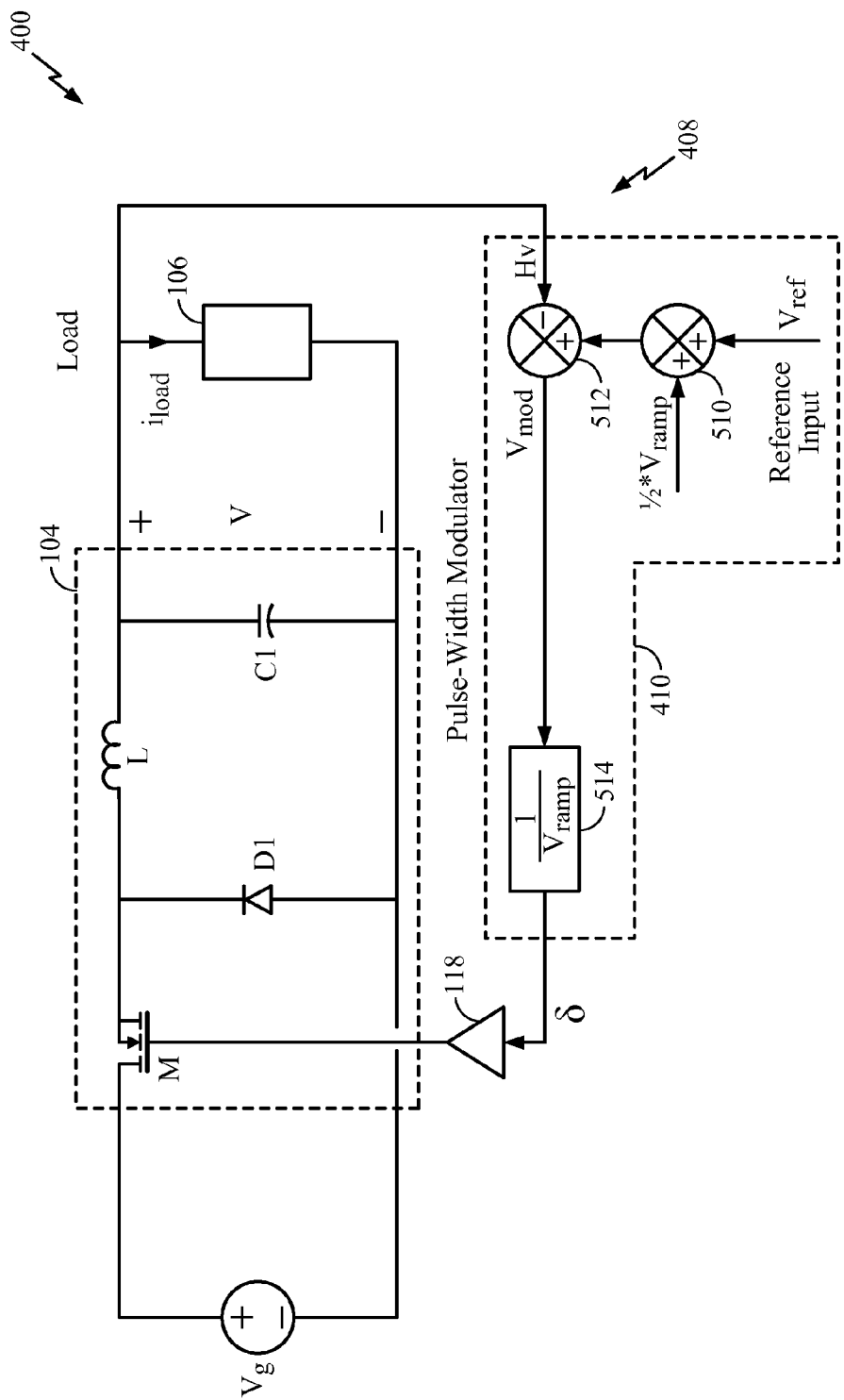
FIG. 6 is a more detailed illustration of the switching power converter of FIG. 4, including the switching unit configured for coupling the output voltage to an input of a pulse-width modulator, in accordance with an exemplary embodiment of the present invention.

FIG. 6 illustrates another illustration of power converter 400 wherein amplifier 410 of FIG. 4 is depicted as a pulse-width modulator 410' coupled between an output of switching unit 104 and an input of gate driver 118. According to an exemplary embodiment, pulse-width modulator 410' includes a summer 510 configured to receive a first signal, which is depicted as a reference input $V_{ref}$ (i.e., a desired output voltage), and a second signal, which may comprise a ramp voltage, or a fraction thereof (e.g., ½*$V_{ramp}$). It is noted that ramp voltage $V_{ramp}$ may comprise a DC voltage corresponding to a height of triangle waveform 415. Summer 510 is configured to convey a scaled reference voltage. Pulse-width modulator 410' further includes a comparator 512 configured to receive output voltage V and the scaled reference voltage conveyed by summer 510. Comparator 512 is further configured to convey a modulated signal Vmod to a divider 514, which may divide modulated signal Vmod by ramp voltage $V_{ramp}$ to generate a duty cycle. Divider 514 may further be configured to convey a signal to gate driver 118. Upon receipt of a signal from pulse-width modulator 520, gate driver 118 is configured to convey a signal to a gate of transistor M1. As an example, if reference voltage $V_{ref}$=1 volt, ramp voltage $V_{ramp}$=0.040 volt, and output voltage V (i.e. Hv)=1 volt, then modulate voltage $V_{mod}$=1−1+0.020=0.020 volt, and duty cycle δ=0.020/0.040, which provides for a 50% duty cycle.

As noted above, and, as illustrated in FIG. 6, an output of switching unit 104 is directly coupled to an input of pulse-width modulator 410' and, therefore, feedback path 408 allows for a fast transient response. Stated another way, feedback path 408, which lacks any element that may induce latency, delay, and/or attenuation, directly couples output voltage V to pulse-width modulator 410'. Accordingly, pulse-width modulator 410' is provided with maximum visibility of output voltage V, and, as a result, may quickly detect, and respond to any changes in output voltage V. Stated yet another way, the direct connection between output voltage V and pulse-width modulator 410' may allow pulse-width modulator 410' to respond instantly and optimally to output voltage changes caused by varying load conditions.

Figure 7:
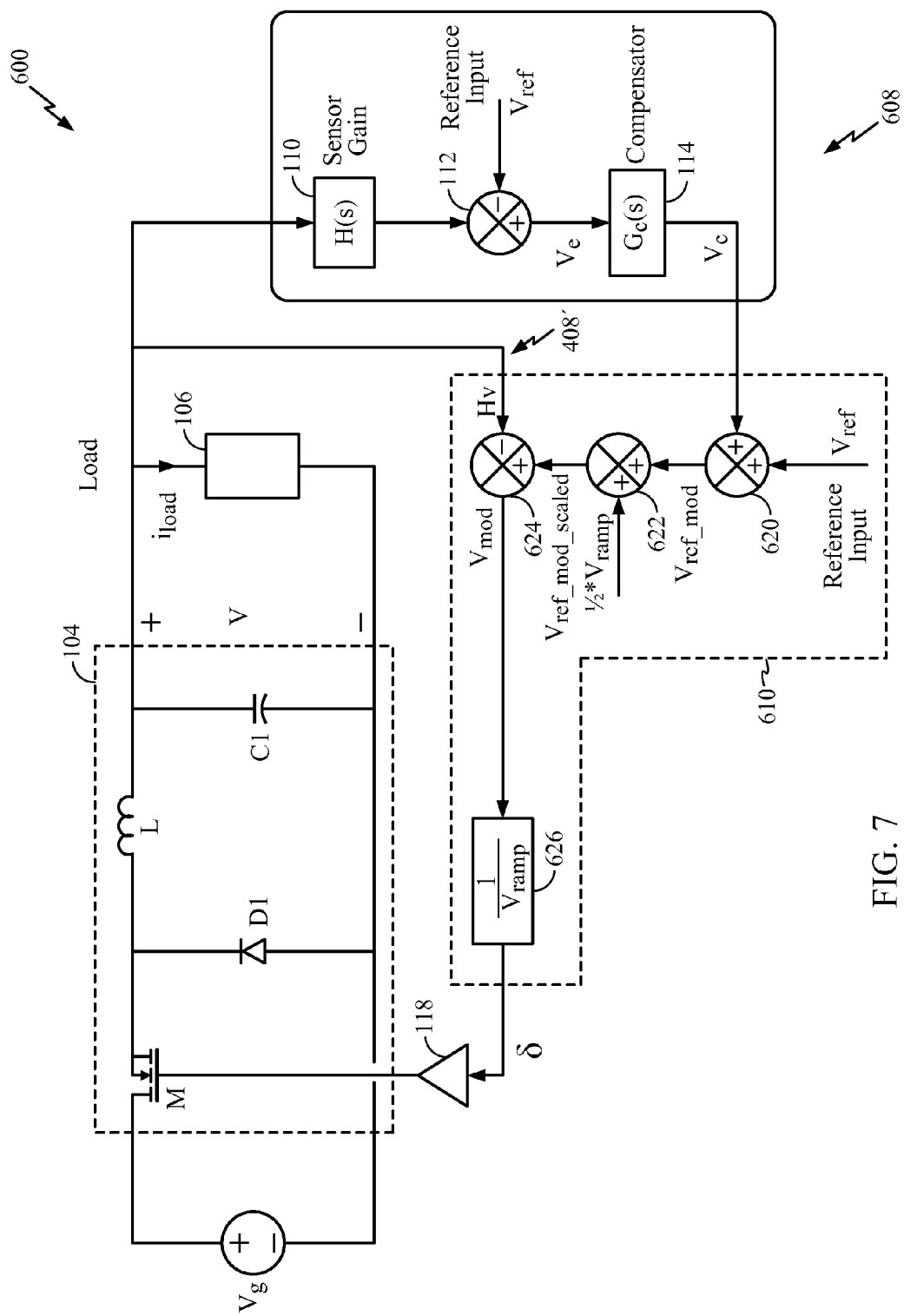
FIG. 7 illustrates another switching power converter including a feedback path directly coupling an output voltage to a pulse-width modulator, and a compensation path for configured for providing error correction, in accordance with an exemplary embodiment of the present invention.

Although configuring pulse-width modulator 410' to directly receive output voltage V via feedback path 408 allows for a fast transient response, the signal provided via feedback path 408 is uncorrected (i.e., output voltage V is in error to the desired voltage) and uncompensated (i.e., may not be stable under all circumstances). FIG. 7 illustrates another switching power converter 600 including a feedback path 408' and a compensation and correction path 608, according to an exemplary embodiment of the present invention. Power converter 600, which is configured to receive input voltage Vg and convey output voltage V, includes switching unit 104 and load 106. Switching unit 104 includes transistor M, diode D1, inductor L, and capacitor C1. Further, power converter 600 includes a pulse-width modulator 610 coupled between an output of switching unit 104 and an input of gate driver 118.

According to an exemplary embodiment, pulse-width modulator 610 includes an summer 620 configured to receive a first signal depicted as reference input $V_{ref}$ (i.e., a desired output voltage) and a second signal depicted as correction signal $V_c$, which is conveyed by compensator 114. Pulse-width modulator 610 further includes summer 622 configured to receive a modified reference voltage $V_{ref\_mod}$, which is output from summer 620, and another signal, which may comprise ramp voltage or a fraction thereof (i.e. $\frac{1}{2}*V_{ramp}$). Pulse-width modulator 610 further includes a comparator 624 configured to receive an output of switching unit 104 (i.e., output voltage V) and an output of summer 622, which may comprise a scaled, modified reference voltage $V_{ref\_mod\_scaled}$. Comparator 624 is further configured to convey a modulated signal $V_{mod}$ to a divider 626, which may divide modulated signal $V_{mod}$ by ramp voltage $V_{ramp}$, which comprises a gain of pulse-width modulator 610, to provide a gain of power converter 600. Divider 626 may also be configured to convey a signal to gate driver 118. Upon receipt of a signal from pulse-width modulator 610, gate driver 118 is configured to convey a signal to a gate of transistor M1.

As illustrated in FIG. 7, an output of switching unit 604 is directly coupled to at least one input of pulse-width modulator 610 via feedback path 408'. Stated another way, similar to power converter power 400 (see FIGS. 4 and 6), power converter 600 includes at least one path (i.e., feedback path 408'), which couples an output of switching unit 104 to gate driver 118 via pulse-width modulator 610, that lacks any elements that may induce latency, delay, and/or attenuation.

In addition to a path lacking any elements that may induce latency, delay, and/or attenuation, the exemplary embodiment illustrated in FIG. 7 includes compensation and correction path 608 configured for error correction and compensation. More specifically, as illustrated in FIG. 7, compensation path 608 includes sensor gain 110 coupled to the output of switching unit 104 and operational amplifier 112 (i.e., an error amplifier) coupled between sensor gain 110 and compensator 114. An output of compensator 114 (i.e., a filter that limits the frequency response of correction voltage $V_c$) is coupled to pulse-width modulator 610. According to an exemplary embodiment of the present invention, compensation path 608 is configured to receive output voltage V, and, in response thereto, generate correction voltage $V_c$, which is added to reference voltage $V_{ref}$ by summer 620 to generate modified reference voltage $V_{ref\_mod}$. Thus, a reference voltage, which is provided to summer 622 is modified and, as a result, the triangle waveform, which is centered around the reference voltage, is modified in response to changes in output voltage V.

It is noted that power converter 600 includes a single feedback control loop, which includes two paths, one fast path (i.e., feedback path 408'), which provides fast transient response for adjusting output voltage V in response to changes in load conditions, and one slow path (i.e., compensation path 608) for error correction.

As will be appreciated by a person having ordinary skill in the art, in comparison to power converters 100 and 300 shown in FIGS. 1-3, which include loop compensation in a single feedback path (i.e., feedback paths 108 and 308), the loop compensation of power converter 600 shown in FIG. 7, is inserted into the triangle waveform by centering the triangle waveform at the desired output voltage. Stated another way, instead of providing error correction in a single feedback path, as shown in power converters 100 and 300, power converter 600 is configured to provide error correction by modifying a reference voltage and, thus, a triangle waveform received by pulse-width modulator 610. Stated yet another way, by modifying reference voltage $V_{ref}$ with correction voltage $V_c$, the triangle waveform, which is centered on reference voltage $V_{ref}$, is moved up or down momentarily as necessary. Thus, a gain of pulse-width modulator 610 may be reduced at a compensation frequency. Accordingly, pulse-width modulator 610 may operate both as a modulator and a low gain error amplifier. Since the error amplifier gain is low, some error adjustment may be made, and can be applied by again by moving the triangle waveform up or down. It is noted that for error correction, the triangle waveform is moved down for duty cycles less than 50% and up for duty cycles greater than 50% (opposite or positive feedback). Further, for compensation, the triangle waveform is moved down for negative changes in output voltage V, which causes the duty cycle from pulse-width modulator 610 to be reduced. The triangle waveform is moved up for positive changes in output voltage V (same direction or negative feedback). This movement may only be temporary, as changes in the duty cycle that match certain frequency constraints are being detected. As an example, compensator 114 may comprise a band pass filter.

According to one exemplary embodiment, correction voltage $V_c$ may be defined as follows:

$$V_c = (V_{ramp}/2) - V_{ramp}*(1-\text{duty cycle}) \qquad (1)$$

Thus, in one example, wherein $V_{ramp}$ is equal to 40 mV and a duty cycle is 15%, correction voltage $V_c$ may provide for a −14 mV adjustment. In another example wherein $V_{ramp}$ is equal to 40 mV and a duty cycle is 70%, correction voltage $V_c$ may provide for an 8 mV adjustment.

A contemplated operation of power converter 600 will now be described. Upon output voltage V being conveyed by power converter 600, comparator 624 may receive output voltage V and provide modulated signal $V_{mod}$ to divider 626. Divider 626 divides modulated signal $V_{mod}$ by a gain of pulse-width modulator 610 to generate duty cycle δ. Divider 626 provides a signal to gate driver 118, which provides a signal to transistor M1. Further, sensor gain 110 may receive output voltage V and convey a signal to operational amplifier 112. Operational amplifier 112 may compare the signal received from sensor gain to reference voltage $V_{ref}$ and output an error signal $V_c$ to compensator 114, which conveys correction signal $V_c$ to summer 620 of pulse-width modulator 610 for modifying the reference voltage within pulse-width modulator 610, which, as a result, modifies the triangle wave that is centered on the reference voltage.

An example operation will now be described. In this example, input voltage Vg=2 volts, reference voltage $V_{ref}$=1 volt, ramp voltage $V_{ramp}$=0.040 volt, and output voltage V=1 volts. Thus, modulated voltage $V_{mod}$=1−1+0.020=0.020 volt and duty cycle δ=0.020/0.040, which result in a 50% duty cycle. Further, if output voltage V=0.990 volt due to applied load then $V_{mod}$=0.990−1+0.020=0.030 volt, duty cycle δ=0.030/0.040, which provides for a 75% duty cycle. The duty cycle of power converter 600 is increased from 50% to 75% in response to a dip in output voltage V. Moreover, if the duty cycle change meets the requirements of compensator 114, then some negative feedback may be applied to slow the rate of change of the duty cycle. If the 75% duty cycle is required for a relatively long time, then error correction may be applied causing a 75% duty cycle to occur at reference voltage $V_{ref}$. Modulated voltage $V_{mod}=V-V_{ref}+\frac{1}{2}*V_{ramp}+V_c$. Therefore, modulated voltage $V_{mod}$=1-1+0.020+0.010=0.020 volt and duty cycle δ=0.030/0.040, which provides for a 75% duty cycle.

Figure 8:
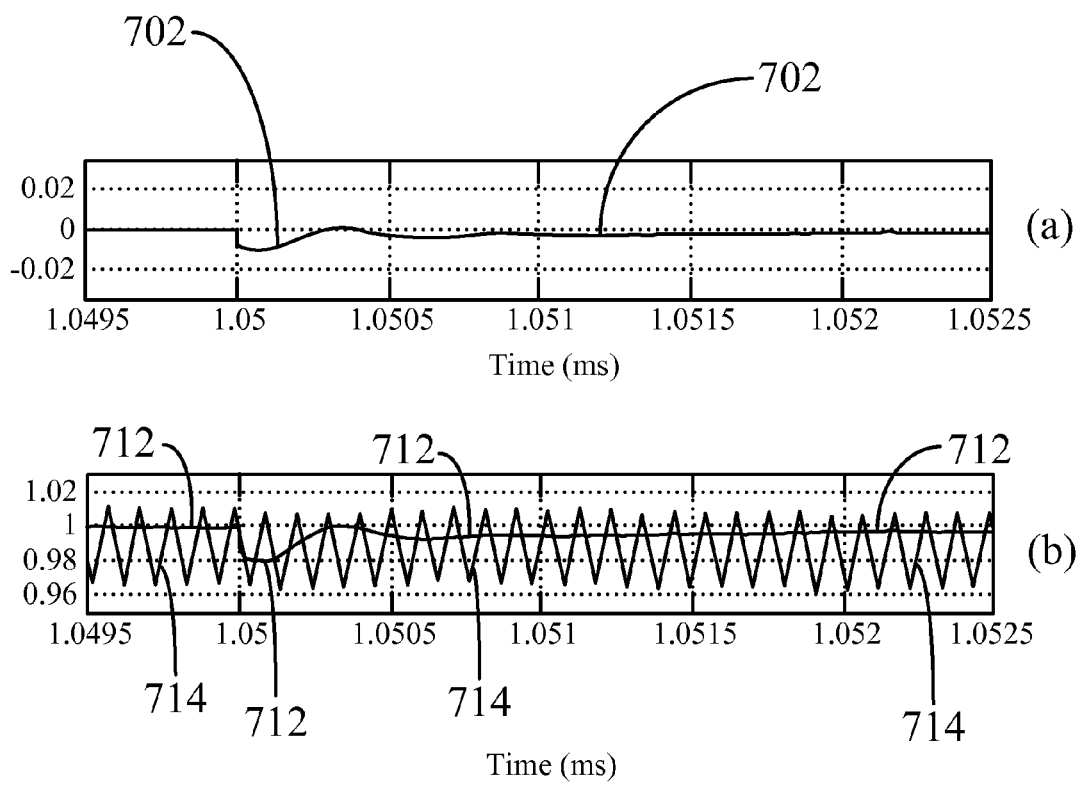
FIG. 8(a) is a plot depicting an error voltage of a switching power converter, in accordance with an exemplary embodiment of the present invention.
FIG. 8(b) is a plot illustrating an output voltage of a switching power converter and a triangle wave to be conveyed to a pulse-width modulator of the switching power converter, according to an exemplary embodiment of the present invention.

FIG. 8(a) includes a plot 700 having a waveform 702 that represents an error voltage of a power converter (e.g., error voltage $V_e$ of power converter 600). Further, FIG. 8(b) includes a plot 710 having a waveform 712 that represents an output voltage of the power converter (e.g., output voltage V of power converter 600). Further, plot 710 includes a waveform 714, which represents a triangle waveform (e.g., triangle waveform 415 of FIG. 5). For example, waveform 714 represents triangle waveform 415 that is centered on a reference voltage utilized by pulse-width modulator 610 of power converter 600.

As illustrated in plots 700 and 710, the voltages of waveform 702 and waveform 712 decrease at approximately 1.05 milliseconds (ms) due to a change in a load coupled to the power converter. Further, as illustrated by waveform 714, the triangle waveform adjusts downward at approximately 1.05 ms in response to the changes in the error voltage and the output voltage of the power converter. Further, as the voltages of waveform 702 and waveform 712 increase, waveform 714 adjusts upward.

Figure 9:
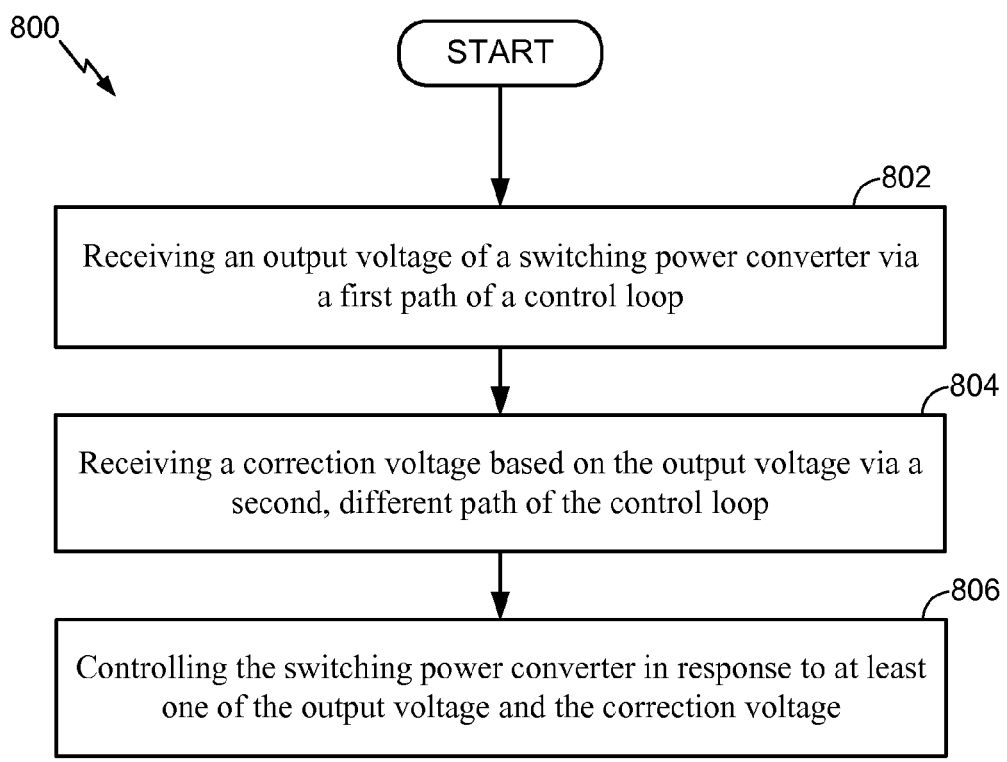
FIG. 9 is a flowchart illustrating a method, according to an exemplary embodiment of the present invention.

FIG. 9 is a flowchart illustrating a method 800, in accordance with one or more exemplary embodiments. Method 800 may include receiving an output voltage of a switching power converter via a first path of a control loop (depicted by numeral 802). Method 800 may also include receiving a correction voltage based on the output voltage via a second, different path of the control loop (depicted by numeral 804). Method 800 may also include controlling the switching power converter in response to at least one of the output voltage and the correction voltage (depicted by numeral 806).

Figure 10:
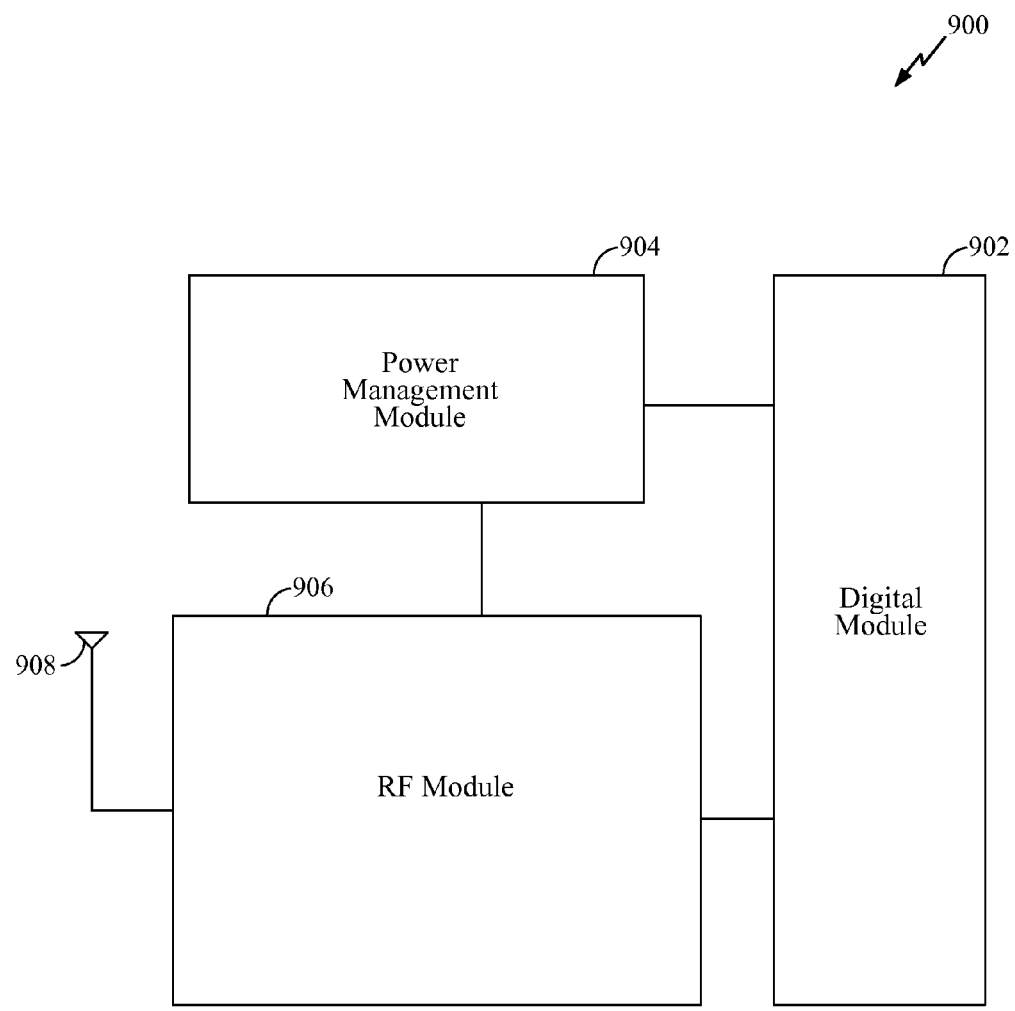
FIG. 10 illustrates a system including a switching power converter, in accordance with an exemplary embodiment of the present invention.

FIG. 10 is a block diagram of a wireless communication device 900. In this exemplary design, wireless communication device 900 includes digital module 904, an RF module 906, and power management module 904. Digital module 204 may comprise memory and one or more processors. RF module 906, which may comprise a radio-frequency integrated circuit (RFIC) may include a transceiver including a transmitter and a receiver and may be configured for bi-directional wireless communication via an antenna 908. In general, wireless communication device 900 may include any number of transmitters and any number of receivers for any number of communication systems, any number of frequency bands, and any number of antennas. Further, power management module 904 may include one or more power converters, such as power converters 400 and 600 illustrated in FIGS. 4, 6, and 7. It is noted that the power converters described herein (i.e., power converter 400 and 600) may be configured for providing voltage regulation of fast dynamic current loads, such as loads found in large digital circuits (e.g., microprocessors and graphics cores).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A power converter, comprising:
   a switching unit configured to receive an input voltage and to convey an output voltage;
   a feedback path including a pulse-width modulator, the feedback path without a filter, the pulse width modulator having an input directly coupled to the output voltage of the switching unit, the pulse width modulator configured to receive a triangular waveform centered on a received reference voltage, the triangular waveform symmetric about the received reference voltage, and to convey a signal to the switching unit; and
   a compensation and correction path configured to receive the output voltage of the switching unit and convey a correction voltage to another input of the pulse-width modulator.

2. The power converter of claim 1, the compensation and correction path including a sensor gain configured to receive the output voltage, an operational amplifier configured to receive an output from the sensor gain, and a compensator configured to receive an error signal generated by the operational amplifier.

3. The power converter of claim 2, the compensator configured to convey the correction signal to the pulse-width modulator for modifying a reference voltage utilized by the pulse-width modulator.

4. A power converter, comprising:
   a switching unit configured to receive an input voltage and to convey an output voltage;
   a feedback path including a pulse-width modulator, the pulse width modulator having an input directly coupled to the output voltage and configured to convey a signal to the switching unit; and
   a compensation and correction path configured to receive the output voltage and convey a correction voltage to another input of the pulse-width modulator,
   the pulse-width modulator comprising:
   a first summer for receiving a reference voltage and a correction voltage and conveying a modified reference voltage;
   a second summer for receiving a scaled ramp voltage and the modified reference voltage and conveying a scaled, modified reference voltage;
   a comparator for receiving the output voltage and the scaled, modified reference voltage and conveying a modulated voltage; and
   a divider configured to receive the modulated voltage, divide the modulated voltage by a gain of the pulse-width modulator and convey an output.

5. The power converter of claim 1, the pulse-width modulator configured to convey a signal to a transistor of the switching unit.

6. The power converter of claim 1, the pulse-width modulator configured to adjust the triangle wave in a direction opposite a direction of the change in the output voltage.

7. The power converter of claim 1, further comprising a single control loop including the feedback path and a compensation path for providing error correction.

8. The power converter of claim 1, the feedback path configured for providing a fast transient response.

9. A method, comprising:
   receiving, by a pulse-width modulator, an output voltage of a switching power converter via a first path of a control loop, the first path of the control loop directly coupling the output voltage to the pulse width modulator without a filter;
   receiving, by the pulse-width modulator, a correction voltage based on the output voltage of the switching power converter via a second, different path of the control loop;
   adjusting a triangular waveform centered on a reference voltage in response to receiving the correction voltage, the triangular waveform symmetric about the received reference voltage; and
   controlling the switching power converter in response to at least one of the output voltage of the switching power converter and the correction voltage.

10. The method of claim 9, wherein receiving an output voltage comprises directly receiving the output voltage at the pulse-width modulator.

11. The method of claim 9, wherein receiving an output voltage comprises detecting changes in the output voltage caused by varying load conditions.

12. The method of claim 9, wherein adjusting the triangle wave comprises adjusting the triangle wave in a direction opposite a direction of the change in the output voltage.

13. The method of claim 9, further comprising centering the triangle wave on the reference voltage.

14. The method of claim 9, further comprising modifying a received reference voltage in response to receiving the correction voltage.

15. A device, comprising:
   means for receiving, by a pulse-width modulator, an output voltage of a switching power converter via a first path of a control loop, the first path of the control loop directly coupling the output voltage to the pulse width modulator without a filter;
   means for receiving, by the pulse-width modulator, a correction voltage based on the output voltage of the switching power converter via a second, different path of the control loop;
   means for adjusting a triangular waveform centered on a reference voltage in response to receiving the correction voltage, the triangular waveform symmetric about the received reference voltage; and
   means for controlling the switching power converter in response to at least one of the output voltage of the switching power converter and the correction voltage.

16. The device of claim 15, further comprising means for adjusting a triangle wave centered on a reference signal in response to receiving the correction voltage.

17. The power converter of claim 1, wherein the input of the pulse width modulator is directly coupled to the output voltage of the switching unit and wherein the pulse width modulator is configured to convey a signal to the switching unit, the pulse-width modulator further configured to adjust the triangle waveform in response to a change in the output voltage.

* * * * *